United States Patent
Leuschner et al.

(10) Patent No.: US 7,707,646 B2
(45) Date of Patent: Apr. 27, 2010

(54) METHOD FOR LICENSING AND/OR AUTHORIZING ACCESS TO SOFTWARE MODULES IN A SWITCHING DEVICE

(75) Inventors: Klaus Leuschner, Vaterstetten (DE); Stephan Schaade, Buchloe (DE)

(73) Assignee: Siemens Aktiengesellschaft, Munich (DE)

( * ) Notice: Subject to any disclaimer, the term of this patent is extended or adjusted under 35 U.S.C. 154(b) by 242 days.

(21) Appl. No.: 10/574,168

(22) PCT Filed: Aug. 16, 2004

(86) PCT No.: PCT/EP2004/009154

§ 371 (c)(1),
(2), (4) Date: Jun. 27, 2007

(87) PCT Pub. No.: WO2005/043816

PCT Pub. Date: May 12, 2005

(65) Prior Publication Data

US 2008/0235812 A1    Sep. 25, 2008

(30) Foreign Application Priority Data

Sep. 30, 2003    (EP)    ................................. 03021963

(51) Int. Cl.
*G06F 17/30* (2006.01)
(52) U.S. Cl. .................. 726/30; 713/153; 713/189; 705/59
(58) Field of Classification Search ............. 713/153, 713/189, 190; 726/26–30
See application file for complete search history.

(56) References Cited

U.S. PATENT DOCUMENTS 6,169,976 B1 * 1/2001 Colosso .................. 705/59

(Continued)

FOREIGN PATENT DOCUMENTS

DE    198 45 610 A1    4/2000

(Continued)

OTHER PUBLICATIONS

Izhtel, "Technical Service Center", Internet Citation, Online, 2002, Internet: www.scnovo.ru/tsc/index.html, Retrieved on Feb. 19, 2004, pp. 1-2, XP002270958.

*Primary Examiner*—Kimyen Vu
*Assistant Examiner*—John B King

(57) ABSTRACT

The invention relates to a switching device for which a license database is used in which the software modules and respective license information associated therewith are stored, and wherein a configuration of at least one of these software modules triggers an interaction between the license database and a computer-readable data carrier, thereby generating hardware characteristic information. Said hardware characteristic information and the license information of the at least one software module are transmitted by the switchboard computer via a communication link to a license manager. Said license manager generates a license confirmation information and retransmits the same to the switchboard computer. The license confirmation information in the switchboard computer decides on the authorization of the at least one software module.

15 Claims, 1 Drawing Sheet

U.S. PATENT DOCUMENTS

| | | |
|---|---|---|
| 6,766,305 B1 * | 7/2004 | Fucarile et al. ............... 705/51 |
| 6,810,389 B1 * | 10/2004 | Meyer ......................... 705/59 |
| 2002/0029347 A1 | 3/2002 | Edelman |
| 2002/0174356 A1 * | 11/2002 | Padole et al. ............... 713/200 |
| 2003/0018899 A1 | 1/2003 | Behr et al. |
| 2003/0125975 A1 | 7/2003 | Danz et al. |
| 2005/0004873 A1 * | 1/2005 | Pou et al. ..................... 705/51 |
| 2005/0047573 A1 * | 3/2005 | Cameron et al. ....... 379/201.12 |

FOREIGN PATENT DOCUMENTS

| | | |
|---|---|---|
| DE | 101 34 356 A1 | 1/2003 |
| DE | 101 55 755 A1 | 5/2003 |
| EP | 1 076 279 A1 | 2/2001 |
| EP | 1 251 656 A1 | 10/2002 |

* cited by examiner

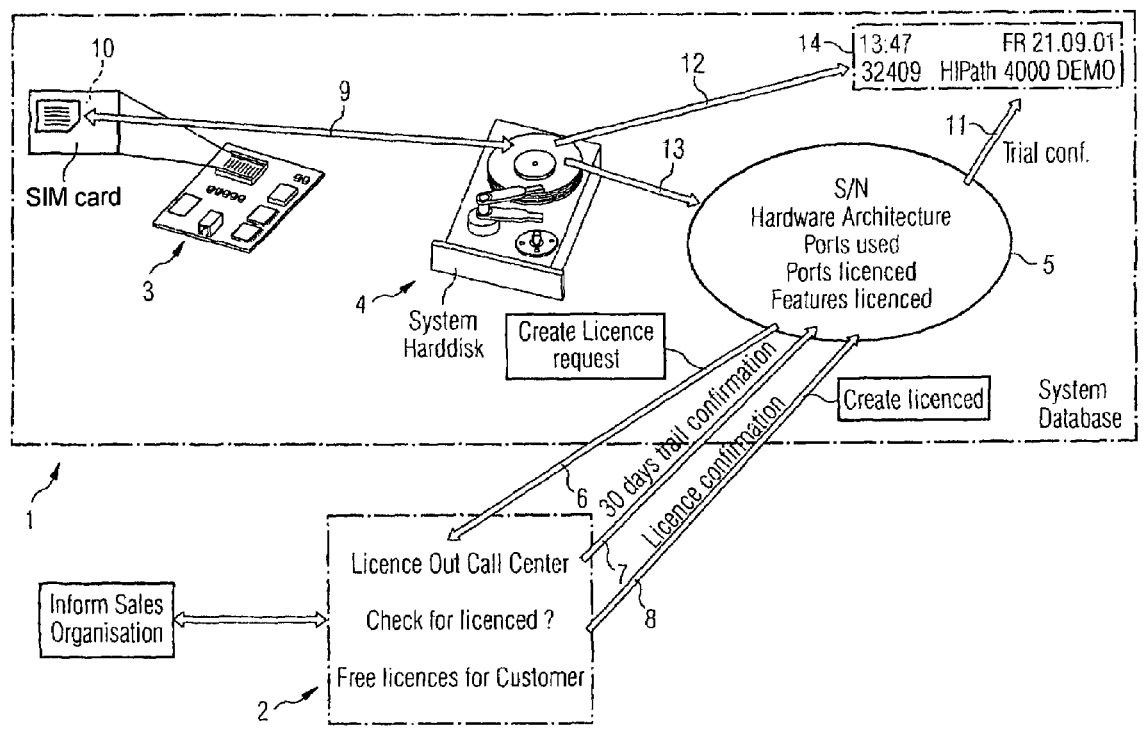

METHOD FOR LICENSING AND/OR AUTHORIZING ACCESS TO SOFTWARE MODULES IN A SWITCHING DEVICE

CROSS REFERENCE TO RELATED APPLICATIONS

This application is the U.S. National Stage of International Application No. PCT/EP2004/009154, filed Aug. 16, 2004 and claims the benefit thereof. The International Application claims the benefits of European application No. 03021963.8 EP filed Sep. 30, 2003, both of the applications are incorporated by reference herein in their entirety.

FIELD OF INVENTION

The invention relates to a method for licensing and/or authorizing access to software modules in a computer-controlled switching device.

BACKGROUND OF INVENTION

In a communication network, such as the telephone network for example, the connection between geographically remote communication subscribers is made by defining sections of a transmission path one at a time. The path selection is the central task of computer-controlled switching devices. These types of switching devices are also known as switching processors, call processors or node processors.

In current private branch exchange networks, computer-controlled switching devices are operated as both conventional telecommunication systems and also as pure IP systems. It is usual to have systems in different size categories, i.e. small private branch exchanges with up to 15 extensions up to large private branch exchange systems with a tens of thousands of extensions. The function and services of ISDN private branch exchange systems are defined in the international standards of the ITU.

Each private branch exchange access line has a range of functions predetermined by service features, which are predetermined in the assigned switchboard computer by configuration or administration of software modules. This configuration or administration can be instigated by the operator of the private branch exchange network or undertaken by operators themselves by using administration commands of the control to activate software modules in a switching device.

Services features are divided up in accordance with the type of traffic into service features for incoming traffic, for outgoing traffic, for routing, for Internet traffic, for charge data recording, for call diversion, interception, for different multilingual text outputs, ISDN service features etc. Each of these service features corresponds in the switching device to a specific function component, which is mostly implemented by a software module.

The currently available functionality of a switching device is determined by the software modules activated. As a rule the operator of the private branch exchange network obtains a license from the manufacturer of the switching device to use these software modules.

Since requirements imposed on a communication system must be oriented to the predetermined demands of the communication user, it is necessary from time to time to reconfigure or administer the capacity stage of switching devices in the network. Thus for example it can be necessary to increase the maximum possible number of communication users of a private branch exchange, or to offer new, improved service features. This adaptation can be achieved by loading new software modules into the database of the switching device and adapting the usage license of the operator accordingly. The loading of new software models is however associated with a corresponding outlay so that manufacturers of the switching devices have gone over to delivering the devices with a full range of application software, but with the application software only being able to be used within the framework of a licensing agreement made between the device manufacturer and the network operator. The manufacturer of switching devices makes every effort in such cases to ensure, by means of protection mechanisms, that the actual scope of usage only varies within the framework of this licensing agreement and that misuse of the arrangement is largely excluded.

Various protection mechanisms for software products are known from computer technology. With personal computers it is usual nowadays to use what are known as dongles. A dongle is an additional hardware part and contains unique and immutable characteristic information. When the software to be protected is started the program interrogates the dongle to ensure that the corresponding characteristic information is stored in it. If it is, the software can run on the personal computer, if not the execution is not permitted. A dongle can also used for a specific software product on a another processor unit provided the hardware and the operating system match. If a number of software products are used on a computer system they each require the corresponding dongle.

SUMMARY OF INVENTION

The use of dongles in the configuration or administration of switching devices is cumbersome and problematic as regards security since there is no provision for storing digital keys with a dongle.

An underlying object of the invention is to simplify the licensing and/or access authorization for software modules in a computer-controlled switching device and to allow flexible adaptation to changing demands.

The object is achieved by the features of the claims. The dependent claims relate to advantageous embodiments of the invention.

The main aspect of the inventive solution proposed consists of making software modules which are already kept with the full range of functions in a switching device scalable, i.e. only able to be used within a predetermined licensing framework.

In accordance with the invention there is provision for use of a licence database in which a all those software modules are stored with the full range of functions which are necessary for a full capacity stage of the switching device. The license database can for example be implemented by conventional disk storage, a hard disk. License information is assigned to each software module on this hard disk. If, as a result of a configuration or administration, at least one of these software modules is activated, in a first step an interaction is initiated between the licence database and a computer-readable data carrier. The aim of this interaction is to check the unique relationship between the hard disk used for the database and secret information stored on a computer-readable data carrier. This identity checking can for example be undertaken by comparing the hard disk identification number and a secret key stored on the computer-readable data carrier. The result of this identity checking is hardware characteristic information which provides information about whether the key and the storage hardware match each other. In a further step this hardware characteristic is now transferred together with the license information of the at least one software module from the switching computer via a communication connection to a license manager geographically remote from the exchange. The licence manager decides about the authorization of the at least one software module to be configured by generating licence confirmation information which it sends back to the switching device. Communication between the switching device and a licence manager can for example be undertaken via a telephone or fax connection or can be established by computer communication Since the licence manager has access on the one hand to information about the identity of the hardware platform and on the other hand to information about the scope of usage of software modules operated on it, the licensing or access authorization to software modules is possible in a simple manner.

To largely exclude misuse a cryptographic algorithm is used in the interaction between the licence database and the computer-readable data carrier.

It is preferred that an asymmetric encryption method which is known per se is used in the interaction between the licence database and the computer-readable data carrier.

Preferably the computer-readable data carrier is embodied as a portable data carrier. This means that in the case of a hardware failure a main circuit board can simply be replaced and the portable data carrier can continue to be used on the new main circuit board. The switching device does not have to be completely reconfigured. This is of decisive importance since the downtimes of a switching device can be significantly reduced in this way.

The portable data carrier can advantageously be embodied as a smart card, a chip card or a Secure Digital/MultiMedia Card. Compared to a software dongle the above cards are more cost effective. These cards are used and handled in much the same way as the SIM cards used in mobile telephones. These are plug-in cards and can thus continue to be used in a new switching device.

As regards data security it is useful for the hardware characteristic information and the licensing information to be transferred by the switching computer to the licence manager in encrypted form. The security level is scalable through the functional scope of the above-mentioned cards.

In a preferred embodiment the licence manager is implemented as a server which is administered by the manufacturer of the switching device. The server features a licence reference database This contains, in the form of reference information, the licences which have been purchased by an operator.

In this case it is recommended that the licence manager, when it generates the license confirmation information, uses a licence reference database in which reference information is stored containing reference information assigned to operators of switching devices in each case. This not only facilitates the administration of licences but also makes it possible for large customers to administer licences in a licence pool for example. This means that licences in the licence pool which have been paid for it but are not being used can be flexibly assigned to the actual requirements of the customer.

In a preferred embodiment there is provision for the licensing information of a software module to be configured to be contained in the licences purchased by the operator, for licensing confirmation information to be generated which authorizes the continuous operation of the software module in the switching device.

In a further preferred embodiment there is provision, in the case in which the licence information of a software module to be configured is not contained in the licences purchased by the operator, for licensing confirmation information to be generated which authorizes test operation of the software module in the switching device over a predetermined period of time.

It is useful if the communication link between the switching device and the licence manager is routed via a circuit-switched and/or packet-switched communication network. This means that the switching device can be remotely administered or remotely configured by steps that execute automatically.

BRIEF DESCRIPTION OF THE DRAWING

The invention is explained by examples below with reference to the enclosed drawing.

The single figure shows a schematic diagram of a scenario of licensing and/or access authorization of software modules of a computer-controlled switching device.

DETAILED DESCRIPTION OF INVENTION

The Figure shows a switching device 1 which communicates with a license manager 2 via a communications link indicated by arrows 6,7,8. In the switching device 1 the reference number 4 designates a database (system hard disk) which is part of a system database 5. The hard disk 4 is assigned a computer-readable data carrier 3. This data carrier 3 is embodied as a SIM card 10. It can be plugged into a reader known as an SSU (Security Service Unit) arranged on a circuit board of the switching device. If the circuit board fails it is possible to continue to use the SIM card on a new circuit board. The functional scope of the controller on the SIM card corresponds to some degree to the SIM cards used in bank cards. On the circuit board a controller (e.g. of type TDA 8007) for activation of the card is assigned to the SIM card. The software modules which represents service features of the switching device are stored in the licence database 4.

For the following description of the execution sequence of the method the initial assumption is made that, although the licence database 4 of the switching device 1 contains all the software modules required for full performance of the system, only those software modules are currently being used for which the operator of the switching device is licensed by the manufacturer of the switching device.

To expand the capacity stage of the switching device and adapt it to growing demand at least one non-licensed software module is activated by the operator. This activation initially triggers an interaction between the licence database 4 and the data carrier 3. (this interaction is shown in the drawing by the arrow 9) The aim of this interaction 9 is to check whether the system hard disk 4 matches a secret key present on the data carrier 3. The result of this identity checking is hardware characteristic information which provides information as to whether the key and the memory hardware have been recognized as matching each other.

If this is the case, in a subsequent step (arrow 13) corresponding hardware characteristic information is created and this is transferred together with the licence information of the at least one software module from the switching computer 1 via a communication connection 5 to the licence manager 2 at a geographically remote location from the exchange 1. In the licence manager 2 an inquiry is made in a licence reference database as to whether the operator identified is authorized to use the desired or already configured software module in his system. If the user is authorized as a result of an existing licence agreement, the licence manager 2 decides about the authorization of the least one software module to be configured in the switching device 1 by generating licence confirmation information (labelled as "License Confirmation" in the drawing) and returning this to the switching device 1. (the return path is shown in the drawing by the arrow 8) This adapts the application software of the switching device 1 to the license framework in respect of its scope of performance.

If on the other hand the user does not have the license for the desired or newly configured capacity stage version of the switching device 1, the licence manager creates second licence confirmation information which differs from that provided above (labelled in the drawings as "30 days trial confirmation"). In this case too this second licence confirmation information is returned to the switching device 1. (the return path is shown in the drawing by the arrow 7) As the arrow 11 ("trial confirmation") indicates, this information transferred leads in the switching device 1 to the desired configuration capacity not been provided for long-term use but only on a test basis, for example for a specific period, 30 days in this example.

Test operation is also enabled in case when the key and the memory are not recognized as matching each other. This is shown in the drawing by the arrow 12.

The test operation can be shown on the display of a subscriber terminal. In the drawing for example this is shown schematically by field 14. This shows: The current time of day "13:45", the current date "21.09.01", the type of installation "HiPath4000", the own telephone number "32409" as well as the label "DEMO". The label "DEMO" indicates that this service feature is not enabled on a permanent basis but only for test purposes.

The invention claimed is:

1. A method for activating non-licensed software modules among a plurality of software modules resident in a computer-controlled switching device within a communications network, comprising:
   providing a switching device including a system database comprising a storage device;
   installing a license database in the switching device, the license database including both one or more non-licensed software modules and licensed software modules and license information, the license information resident in the switching device pertaining to each of the software modules;
   connecting a computer-readable data carrier to the switching device and initiating an interaction between the license database and the computer-readable data carrier with a cryptographic algorithm to determine whether the storage device and the computer-readable data carrier each include matching hardware identification information;
   next transmitting determined matching hardware identification information and license information pertaining to at least one software module over communication link from the switching device to a license manager, the license manager then determining whether license authorization exists for the switching device to use the at least one software module;
   the license manager then generating a license confirmation via license reference database having licenses for software modules purchased for the switching device; and
   sending the license confirmation to the switching device thereby permitting use of the software module,
   wherein the license manage is remotely located from the switching device.

2. The method according to claim 1, wherein an asymmetrical encryption is used in the interaction between the license database and the computer-readable data carrier.

3. The method according to claim 2, wherein the computer-readable data carrier is a card selected from the group consisting of smart card, chip card and SD/MultiMedia card.

4. The method according to claim 3, wherein the hardware identification information is created from a identification number of the license database and information stored on the card.

5. The method according to claim 3, wherein the hardware identification information and the license information transmitted from the switching device to the license manger are encrypted.

6. The method according to claim 5, wherein the license manager is a server and is networked with the switching device via a communication network.

7. The method according to claim 6, wherein the generated license confirmation authorizes operation of the software module in the switching device when the license information for the software module is included in the license reference database.

8. The method according to claim 6,
   wherein the generated license confirmation authorizes a test operation of the software module in the switching device when the license information for the software module is not included in the license reference database and
   wherein the test operation is for a period of time.

9. The method according to claim 6, wherein the communication connection between the switching device and the license manager is routed via a circuit-switched or a packet switch communication network.

10. The method according to claim 1, wherein the computer-readable data carrier is a card selected from the group consisting of smart card, chip card and SD/MultiMedia card.

11. The method according to claim 1, wherein the hardware identification information and the license information transmitted from the switching device to the license manager are encrypted.

12. The method according to claim 1, wherein the license manager is a server and is networked with the switching device via a communication network.

13. The method according to claim 1, wherein the generated license confirmation authorizes an operation of the software module in the switching device when the license information for the software module is included in the license reference database.

14. The method according to claim 1,
   wherein the generated license confirmation authorizes a test operation of the software module in the switching device when the license information for the software module is not included in the license reference database and
   wherein the test operation is for a period of time.

15. The method according to claim 1, wherein the communication connection between the switching device and the license manager is routed via a circuit-switched or a packet switch communication network.

* * * * *